United States Patent
Hörtling

(10) Patent No.: US 9,636,763 B2
(45) Date of Patent: May 2, 2017

(54) TOOL-FREE BLADE CHANGE SYSTEM

(71) Applicants: Robert Bosch Tool Corporation, Chicago, IL (US); Robert Bosch GmbH, Stuttgart (DE)

(72) Inventor: Andreas Hörtling, Schwaigern (DE)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 476 days.

(21) Appl. No.: 14/139,959

(22) Filed: Dec. 24, 2013

(65) Prior Publication Data

US 2014/0182442 A1    Jul. 3, 2014

Related U.S. Application Data

(60) Provisional application No. 61/747,435, filed on Dec. 31, 2012.

(51) Int. Cl.
| | | |
|---|---|---|
| *B26D 7/26* | (2006.01) | |
| *B27B 5/32* | (2006.01) | |
| *B23D 61/10* | (2006.01) | |
| *F16B 39/32* | (2006.01) | |
| *F16B 39/282* | (2006.01) | |

(52) U.S. Cl.
CPC ........... *B23D 61/10* (2013.01); *B26D 7/2621* (2013.01); *B27B 5/32* (2013.01); *F16B 39/282* (2013.01); *F16B 39/32* (2013.01); *Y10T 29/49963* (2015.01); *Y10T 83/9464* (2015.04)

(58) Field of Classification Search
CPC ............ Y10T 83/9379; Y10T 83/7747; B26D 7/2621; B27B 5/32; B23D 61/10; F16B 39/32; F16B 39/282; Y10S 411/949
USPC .................................................. 411/326, 332
See application file for complete search history.

(56) References Cited

U.S. PATENT DOCUMENTS

| | | | | |
|---|---|---|---|---|
| 5,161,334 A | * | 11/1992 | Schaal ................. | B24B 45/006 411/432 |
| 5,388,942 A | * | 2/1995 | Bonacina .............. | B27B 5/32 411/348 |
| 5,494,368 A | * | 2/1996 | Matthews ............. | B24B 45/006 403/256 |
| 5,899,648 A | * | 5/1999 | Kanaan ................. | F16B 31/02 411/1 |
| 6,843,627 B2 | * | 1/2005 | Childs ................... | B27B 5/32 411/408 |
| 8,784,027 B2 | * | 7/2014 | Hess ..................... | F16B 39/24 411/326 |

FOREIGN PATENT DOCUMENTS

AU        WO 9500288 A1 *  1/1995  ............... B23C 5/26

\* cited by examiner

*Primary Examiner* — Stephen Choi
*Assistant Examiner* — Evan MacFarlane
(74) *Attorney, Agent, or Firm* — Maginot Moore & Beck LLP

(57) ABSTRACT

A tool-free blade change system in one embodiment includes a handle, an arbor bolt including a keyed portion configured to mate with a keyed bore of the handle to restrict rotation of the handle with respect to the arbor bolt, a blade washer defining a plurality of washer teeth which enmesh with the body teeth so as restrict rotation of the handle with respect to the blade washer in one direction while allowing rotation of the handle with respect to the blade washer in another direction, and a biasing member configured to bias the handle downwardly toward the blade washer, wherein the handle is axially movable with respect to the blade washer between a first position whereat the plurality of body teeth are enmeshed with the plurality of washer teeth and a second position whereat the plurality of body teeth are spaced apart from the plurality of washer teeth.

20 Claims, 4 Drawing Sheets

TOOL-FREE BLADE CHANGE SYSTEM

This application claims the benefit of U.S. Provisional Application No. 61/747,435, filed Dec. 31, 2012, the entire contents of which are herein incorporated by reference.

TECHNICAL FIELD

The disclosure relates generally to power tools, and more particularly to power tools with a circular blade.

BACKGROUND

A circular saw generally includes a circular blade having a centrally located hole for mounting the blade to a rotatable shaft. The blade is conventionally mounted to an end of the rotatable shaft in compression between an inner flange and outer flange or washer, held by a conventional arbor bolt threaded into a threaded bore in the shaft.

Circular saw blades must be replaced periodically due to blade wear and to accommodate a variety of different cutting uses. In order to install or remove a blade, a wrench typically must be used to supply sufficient torque to remove the bolt from the shaft. Inconveniences are incurred by the use of a conventional bolt to mount a circular saw blade. For example, the task of obtaining an appropriate wrench can be time consuming, and using the wrench can be cumbersome.

Furthermore, a circular saw generates substantial torque when the saw blade rotationally accelerates or decelerates. In some instances, the saw can generate enough torque to loosen the arbor bolt holding the saw blade on the saw. It is therefore desirable to provide an improved mechanism for removing and replacing a circular saw blade. Additionally, it is desirable to provide a system that enables a quick and easy removal of the circular saw blade without additional tools.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure are related to a tool-free blade change system. The system includes a main body, an arbor bolt, and a blade washer. The main body and blade washer have teeth that fit together to enable the body to lock with the blade washer to disable the system from loosening due to inertial forces. The bolt is configured to be operated by a user without a tool to enable quick and easy removal of the circular saw blade.

A tool-free blade change system in one embodiment includes a main body including a keyed bore and plurality of body teeth, an arbor bolt including a keyed portion configured to mate with the keyed bore to restrict rotation of the main body with respect to the arbor bolt while allowing for axial movement of the main body with respect to the arbor bolt, a blade washer defining a plurality of washer teeth configured to enmesh with the plurality of body teeth so as restrict rotation of the main body with respect to the blade washer in a first direction while allowing rotation of the main body with respect to the blade washer in a second direction, and a biasing member configured to bias the main body downwardly toward the blade washer, wherein the main body is axially movable with respect to the blade washer between a first position whereat the plurality of body teeth are enmeshed with the plurality of washer teeth and a second position whereat the plurality of body teeth are spaced apart from the plurality of washer teeth.

In another embodiment, a method of operating a tool-free blade change system includes inserting a threaded portion of an arbor bolt through a hole in a blade, inserting the threaded portion of the arbor bolt into a threaded bore in a rotatable shaft, rotating the threaded portion of the arbor bolt within the threaded bore by forcing a keyed portion of a handle against a keyed portion of the arbor bolt, forcing a blade washer against the blade by the rotation of the threaded portion of the arbor bolt, rotating at least one of a plurality of teeth of the handle past at least one of a plurality of teeth of the blade washer by the rotation of the threaded portion of the arbor bolt, and biasing the plurality of teeth of the handle into engagement with the plurality of teeth of the blade washer with a biasing member.

DESCRIPTION

Figure 1:
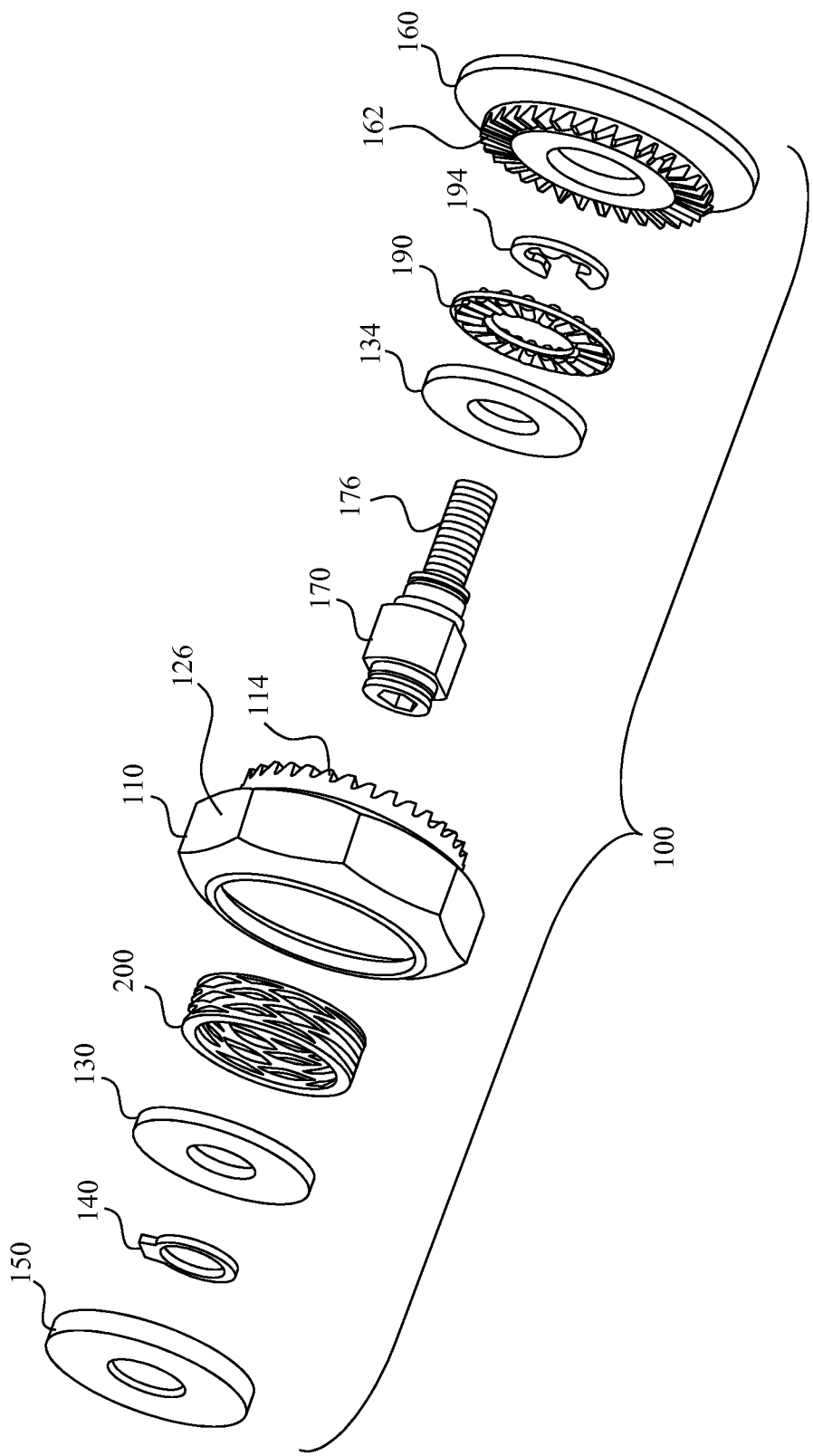
FIG. 1 is an exploded perspective view of a tool-free blade change system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

FIG. 1 illustrates an exploded view of one embodiment of a tool-free blade change system 100. The tool-free blade change system 100 includes a main body 110, a compression spring 200, an upper washer 130, a lower washer 134, a first retaining member in the form of a snap ring 140, a cap 150, a blade washer 160, an arbor bolt 170, a second retaining member in the form of a retaining ring 194, and a thrust bearing 190.

Figure 2:
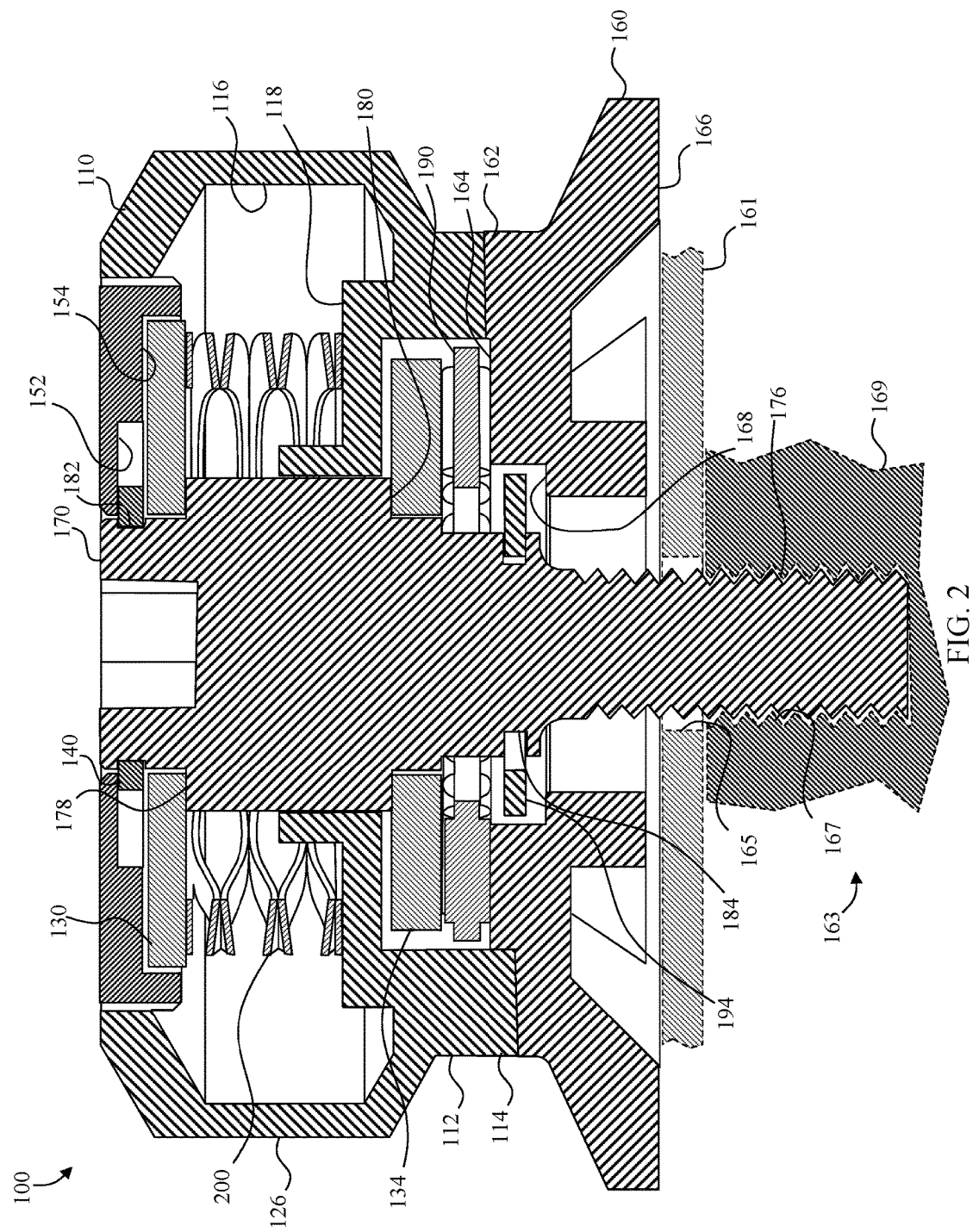
FIG. 2 is a cross-sectional view of the tool-free blade change system of FIG. 1.
Figure 3:
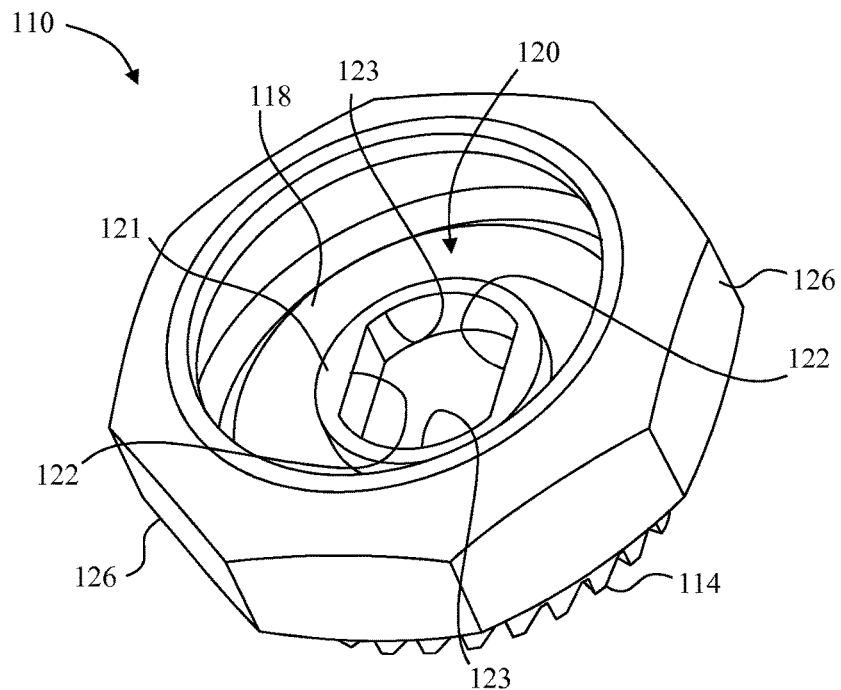
FIG. 3 is a perspective view of a main body of the tool-free blade change system of FIG. 1.

With reference to FIGS. 2 and 3 and continuing reference to FIG. 1, the main body 110, also referred to as a "handle", includes a plurality of outer surfaces 126, an annular projection 112 having a plurality of teeth 114, an inner cavity 116, and an opening 120 defined by a keyed flange 121 having two flat surfaces 122 positioned on opposite sides of the opening. Two curved surfaces 123 are located between the two flat surfaces 122. The inner cavity 116 is defined inside the main body 110, and is defined in part by an upwardly facing annular inner surface 118. The plurality of outer surfaces 126 are arranged around the outside of the main body 110 and are configured to enable a user to manually grip, pull, and twist the main body 110. In the illustrated embodiment, the main body includes eight outer surfaces, though in other embodiments the main body can include any desired number of outer surfaces. The surfaces 126 in some embodiments are textured.

Figure 4:
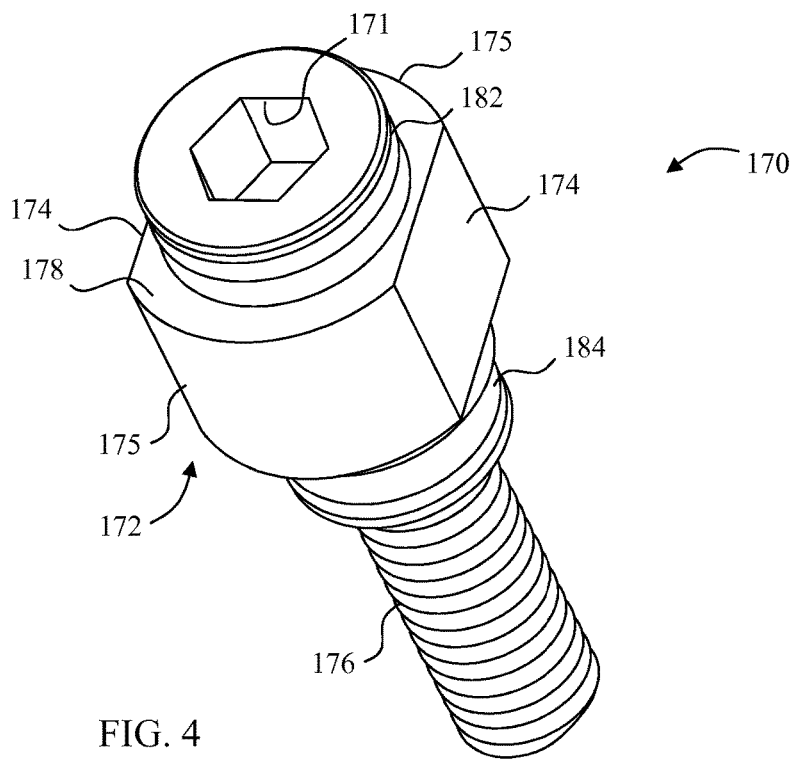
FIG. 4 is a side perspective view of an arbor bolt of the tool-free blade change system of FIG. 1.

Referring to FIGS. 1, 2, and 4, the arbor bolt 170 includes a head 172 with an internal hex 171 and a threaded region 176 extending from the head 172. The head 172 includes a keyed portion with two flat outer surfaces 174 and two rounded outer surfaces 175. The head 172 further includes an upper shoulder 178, a lower shoulder 180, an upper groove 182, and a lower groove 184. The internal hex 171 is provided for use by a user who cannot or chooses not to rotate the arbor bolt 170 using the surfaces 126. In such a case, the user can loosen the bolt with a hex head tool.

The upper groove 182 is located near the top of the arbor bolt and is configured to accommodate the snap ring 140 to retain the snap ring 140 in a fixed axial position relative to the arbor bolt 170 when assembled as shown in FIG. 2. The upper washer 130 rests on the upper shoulder 178, while the lower washer 134 contacts the lower shoulder 180 of the arbor bolt 170. The lower groove 184 accommodates the retaining ring 194 to hold the retaining ring 194 in a fixed axial position relative to the arbor bolt 170.

In the configuration of FIG. 2, the flat outer surfaces 174 of the arbor bolt 170 are positioned in opposition to the flat surfaces 122 (FIG. 3) of the main body 110 while the rounded surfaces 175 are in opposition to the rounded surfaces 123. Because of this keyed relationship, rotational motion of the main body 110 is transferred to the arbor bolt 170 to enable the main body 110 and arbor bolt 170 to rotate together.

As further depicted in FIG. 2, the threaded region 176 includes a plurality of threads that extend past the outer blade washer 160. Accordingly, the tool-free blade change system 100 can be used to mount a blade 161 to a tool 163 by inserting the threaded region 176 through an aperture 165 in the blade 161 and mated with a threaded bore 167 in a power shaft 169 of a circular saw or other tool to clamp the circular saw blade between the outer blade washer 160 and an inner blade washer (not shown) that is positioned between the saw blade and the threaded bore. In FIG. 2, the tool 163 and blade 161 and their various components are depicted with a dashed line to indicate that no particular proportions between the tool 163, the blade 161, and the tool-free blade change system 100 is to be inferred from FIG. 2. In the illustrated embodiment, the threads are arranged in a left-hand thread, by which is meant the bolt 170 is tightened by turning the bolt 170 counter-clockwise and loosened by turning the bolt 170 clockwise. However, the reader should appreciate that the system described herein can be applied to a bolt having a right-hand thread as well.

Figure 5:
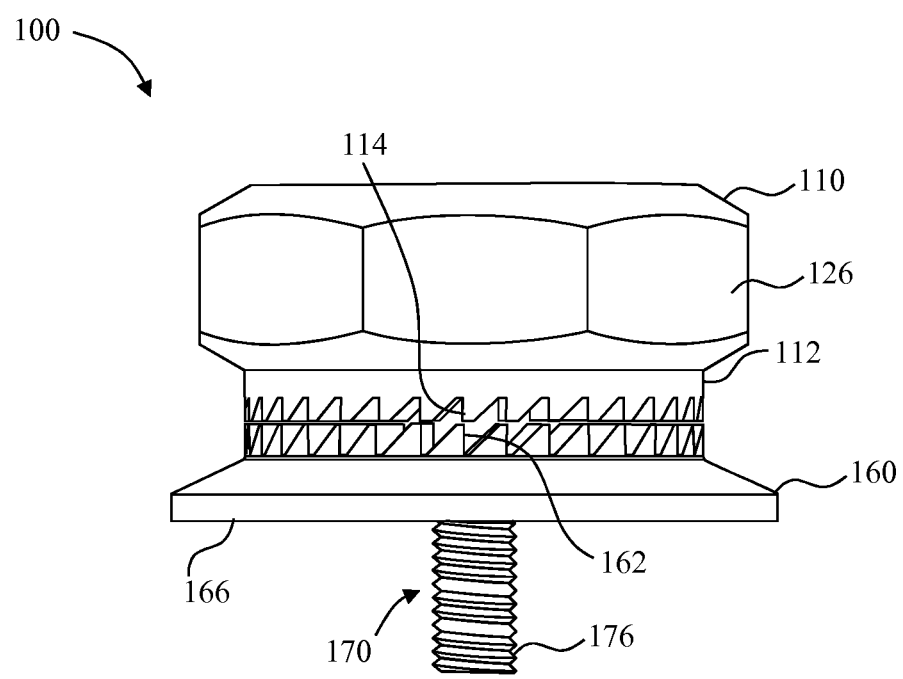
FIG. 5 is a side view of the tool-free blade change system of FIG. 1 with the teeth disengaged.

Referring to FIGS. 1, 2, and 5, the blade washer 160 includes a plurality of teeth 162, an upper surface 164, a lower surface 166, and a well 168. The plurality of teeth 162 of the blade washer 160 are configured such that the teeth 162 of the washer 160 can engage the teeth 114 of the main body 110 in a complimentary fashion. As will be described in more detail below, the complimentary engagement of the teeth 114 and 162 prevents the arbor bolt 170 from turning clockwise and loosening from the circular saw blade while the teeth 114 and 162 are engaged. As shown in FIG. 5, the teeth 162 are angled on one side to enable the teeth 162 to slip with the teeth 114 of the main body 110 to enable the main body 110 to rotate in the counter-clockwise direction with respect to the blade washer 160 to tighten the tool-free blade change system 100 against a circular saw blade.

Continuing with FIG. 2, the thrust bearing 190 rests on the upper surface 164 of the blade washer 160, while the lower surface 166 is configured to rest against the blade (not shown). The retaining ring 194, which is positioned within the groove 184 of the arbor bolt 170, retains the thrust bearing 190 and lower washer 134 about the arbor bolt 170 when the main body 110 is disengaged from the blade washer 160.

The compression spring 200, upper washer 130, snap ring 140, and cap 150 are positioned within the inner cavity 116 of the main body 110. The cap has a first surface 152 and a second surface 154 below and radially outward from the first surface 152. The upper washer 130 rests on the upper shoulder 178 of the arbor bolt 170 and on the second surface 154 of the cap 150. The system 100 is configured such that the compression spring 200 or other biasing member presses upwardly (in the view of FIG. 2) against the upper washer 130 and downwardly against the inner surface 118 of the main body 110. The snap ring 140 is positioned within the upper groove 182 of the arbor bolt 170 to hold the upper washer 130 in axial position relative to the arbor bolt 170 against the force of the compression spring 200. The restoring force of the compression spring 200 therefore acts to urge the main body 110 downwardly to engage the teeth 114 of the main body 110 with the teeth 162 of the blade washer 160 in the absence of an external force.

The lower washer 134 and the thrust bearing 190 are positioned between the lower shoulder 180 of the arbor bolt 170 and the upper surface 164 of the blade washer 160. The thrust bearing 190 engages the upper surface 164 of the blade washer 160 and the lower washer 134 to enable the arbor bolt 170 and lower washer 134 to rotate relative to the blade washer 160, even with the arbor bolt 170, lower washer 134, thrust bearing 190, and blade washer 160 in contact with one another.

In operation, the tool-free blade change system 100 is inserted through a circular working tool such as a saw blade into a threaded bore of a power shaft of a power tool such as a circular saw (not shown) and the threaded region 176 of the arbor bolt 170 is threaded into the threaded bore. The user grasps the surfaces 126 of the main body 110 to turn the main body 110 in the counter-clockwise direction. In response to the counter-clockwise rotation of the main body 110, the arbor bolt 170 rotates counter-clockwise due to the engagement of the flat surfaces 122 of the main body 110 with the flat surfaces 174 of the arbor bolt 170. Furthermore, as the main body 110 is turned counter-clockwise (or to the right in the view of FIG. 5), the teeth 114 of the main body 110 slip with the teeth 162 of the blade washer 160. Specifically, the left side of each of the teeth 162 is angled while the right side is substantially vertical, and the right side of each of the teeth 114 is angled while the left side is substantially vertical ("left" and "right" are used herein in reference to the sides of the teeth 114 and 116 refers to the orientation as presented in FIG. 5). This configuration allows the main body 110 and the arbor bolt 170 to rotate relative to the blade washer 160 to tighten the arbor bolt 170 to the threaded bore.

As the circular saw or other tool is used, inertia forces of the circular saw due to the torque generated during acceleration and deceleration of the saw blade urge the arbor bolt 170 to rotate in the clockwise direction. However, when the teeth 114 and 162 of the main body 110 and blade washer 160, respectively, are engaged, the main body 110 and arbor bolt 170 are prevented from rotating in the clockwise direction. Thus, the tool-free blade change system 100 remains tightly affixed to the threaded bore and the blade remains tightly attached to the circular saw.

To remove the blade or other shaping device, the user pulls upwardly (in the view of FIG. 2) on the main body 110, against the force of the compression spring 200, until the teeth 114 of the main body 110 disengage from the teeth 162 of the blade washer 160, as shown in FIG. 5. The axial height of the keyed flange 121 is greater than the height of the teeth 114/162. Accordingly, while the teeth become disengaged, the flat surfaces 122 are still at least partially in opposition to the flat surfaces 174. Consequently, once the teeth 114 and 162 are disengaged, the user rotates the main body 110 clockwise, which results in the arbor bolt 170 turning clockwise. The arbor bolt 170 unscrews from the threaded bore of the circular saw, enabling removal of the blade from the circular saw.

While not shown in FIG. 2, in some embodiments the washer 160 is configured to assist in maintaining the washer 160 and the arbor bolt 170 in alignment when the teeth 114/162 are not engaged. For example, the well 168 in some embodiments is deeper than the height of the teeth 114/162. Accordingly, as the teeth 114/162 disengage, the retaining ring 194 remains within the well 168, assisting in maintaining the arbor bolt 170 aligned with the washer 160.

Accordingly, a method of operating a tool-free blade change system includes inserting a threaded portion of an arbor bolt through a hole in a blade, inserting the threaded portion of the arbor bolt into a threaded bore in a rotatable shaft, rotating the threaded portion of the arbor bolt within the threaded bore by forcing a keyed portion of a handle against a keyed portion of the arbor bolt, forcing a blade washer against the blade by the rotation of the threaded portion of the arbor bolt, rotating at least one of a plurality of teeth of the handle past at least one of a plurality of teeth of the blade washer by the rotation of the threaded portion of the arbor bolt, and biasing the plurality of teeth of the handle into engagement with the plurality of teeth of the blade washer with a biasing member.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A tool-free blade change system, comprising:
a main body including a keyed bore and plurality of body teeth;
an arbor bolt including a keyed portion mated with the keyed bore to restrict rotation of the main body with respect to the arbor bolt while allowing for axial movement of the main body with respect to the arbor bolt such that a first surface of the keyed portion is substantially rotationally fixed with respect to a second surface of the keyed bore;
a blade washer defining a plurality of washer teeth configured to enmesh with the plurality of body teeth so as restrict rotation of the main body with respect to the blade washer in a first direction while allowing rotation of the main body with respect to the blade washer in a second direction; and
a biasing member configured to bias the main body downwardly toward the blade washer, wherein the main body is axially movable with respect to the blade washer between a first position whereat the plurality of body teeth are enmeshed with the plurality of washer teeth with the mated keyed portion and keyed bore restricting relative motion between the arbor bolt and the main body in both the first direction and the second direction, and a second position whereat the plurality of body teeth are spaced apart from the plurality of washer teeth.

2. The system of claim 1, wherein:
the arbor bolt includes a left-hand threaded portion;
the plurality of washer teeth each have an angled left side and a substantially vertical right side; and
the plurality of body teeth each have an angled right side and a substantially vertical left side.

3. The system of claim 1, further comprising:
a first retaining member operably connected to the arbor bolt and the biasing member, wherein the biasing member is configured to bias the main body and the arbor bolt in opposite directions.

4. The system of claim 3, wherein:
the arbor bolt comprises a first groove; and
the first retaining member is partially received within the first groove.

5. The system of claim 4, further comprising a first washer positioned between the first retaining member and the biasing member.

6. The system of claim 3, wherein the main body further comprises:
an upwardly facing surface, wherein the biasing member operably contacts the upwardly facing surface.

7. The system of claim 3, further comprising:
a second washer positioned at least partially below a lower shoulder of the arbor bolt;
a thrust bearing positioned beneath the second washer and in operable contact with the blade washer; and
a second retaining member operably connected to the arbor bolt, wherein the second washer and the thrust bearing are positioned between the lower shoulder of the arbor and the second retaining member.

8. The system of claim 7, wherein:
the arbor bolt comprises a second groove; and
the second retaining member is partially received within the second groove.

9. The tool-free blade change system of claim 7, wherein the blade washer further comprises:
a main body facing side;
a blade facing side opposite the main body facing side and located downwardly from the main body facing side; and
a well extending downwardly from the main body facing side, the well having a depth which is greater than a maximum height of the plurality of washer teeth, the second retaining member positioned within the well.

10. The system of claim 3, wherein the keyed portion of the arbor bolt comprises a first and a second flat side portion separated by a first and a second round side portion.

11. The tool-free blade change system of claim 1, wherein the main body is configured to transfer rotational force to the arbor bolt through the keyed bore.

12. The tool-free blade change system of claim 11, wherein the keyed portion of the bore has a maximum height along an axis of the bore which is greater than a maximum height of the plurality of teeth of the blade washer along an axis of a bore in the blade washer.

13. The system of claim 1, further comprising a third surface of the keyed portion substantially rotationally fixed with respect to a fourth surface of the keyed bore, wherein:
the first surface is a planar surface extending parallel to an axis of the arbor bolt;
the second surface is a planar surface extending parallel to the axis of the arbor bolt;

the third surface is a planar surface extending parallel to the axis of the arbor bolt;

the fourth surface is a planar surface extending parallel to the axis of the arbor bolt;

the first surface is in direct opposition to the second surface; and the third surface is in direct opposition to the fourth surface.

14. A method of operating a tool-free blade change system, comprising:

inserting a threaded portion of an arbor bolt through a hole in a blade;

inserting the threaded portion of the arbor bolt into a threaded bore in a rotatable shaft;

rotating the threaded portion of the arbor bolt within the threaded bore in a first direction by forcing a first surface of a keyed portion of a handle against a second surface of a keyed portion of the arbor bolt, wherein the first surface of the keyed portion is substantially rotationally fixed with respect to the second surface of the keyed bore;

forcing a blade washer against the blade by the rotation of the threaded portion of the arbor bolt;

rotating at least one of a plurality of teeth of the handle past at least one of a plurality of teeth of the blade washer by the rotation of the threaded portion of the arbor bolt with the first surface of the keyed portion substantially rotationally fixed with respect to the second surface of the keyed bore;

biasing the plurality of teeth of the handle into engagement with the plurality of teeth of the blade washer with a biasing member; and restricting relative motion between the arbor bolt and the handle in both the first direction and a second direction opposite the first direction with the keyed portion of the handle mated with the keyed portion of the arbor bolt with the plurality of teeth of the handle biased into engagement with the plurality of teeth of the blade washer.

15. The method of claim 14, further comprising:

moving a substantially vertical portion of each of the plurality of teeth of the handle out of contact with a substantially vertical portion of each of the plurality of teeth of the blade washer by moving the handle upwardly away from blade washer; and rotating the threaded portion of the arbor bolt within the threaded bore in a second direction by forcing the keyed portion of the handle against the keyed portion of the arbor bolt, thereby removing the threaded portion of the arbor bolt from the threaded bore.

16. The method of claim 15, wherein moving the handle away from blade washer comprises:

compressing the biasing member.

17. The method of claim 16, wherein compressing the biasing member comprises:

compressing the biasing member between an upward facing surface of the handle and a first retaining member axially fixed with respect to the arbor bolt.

18. The method of claim 15, further comprising:

moving the keyed portion of the handle in parallel to the keyed portion of the of the arbor bolt while moving the substantially vertical portion of each of the plurality of teeth of the handle out of contact with the substantially vertical portion of each of the plurality of teeth of the blade washer.

19. The method of claim 14, wherein forcing the blade washer against the blade by the rotation of the threaded portion of the arbor bolt comprises:

forcing a thrust bearing against the blade washer using a lower shoulder of the arbor bolt.

20. The method of claim 14, wherein the keyed portion of the handle has a maximum height along an axis of the handle which is greater than a maximum height of the plurality of teeth of the blade washer along an axis of a bore in the blade washer.

* * * * *